United States Patent [19]

Meyers

[11] Patent Number: 4,752,874
[45] Date of Patent: Jun. 21, 1988

[54] CASH DRAWER/OPERATOR IDENTIFICATION

[75] Inventor: Thomas J. Meyers, St. Clairsville, Ohio

[73] Assignee: NCR Corporation, Dayton, Ohio

[21] Appl. No.: 824,495

[22] Filed: Jan. 31, 1986

[51] Int. Cl.$^4$ ............................................. G06F 3/12
[52] U.S. Cl. ................................... 364/405; 235/379
[58] Field of Search ................ 235/379; 364/404, 405, 364/406

[56] References Cited

U.S. PATENT DOCUMENTS

| | | | |
|---|---|---|---|
| 2,883,104 | 4/1959 | Kintner | 235/22 |
| 3,855,432 | 12/1974 | Kelly et al. | 200/61.61 |
| 4,027,140 | 5/1977 | Fowler et al. | 235/7 R |
| 4,070,564 | 1/1978 | Tucker | 364/405 |
| 4,100,534 | 7/1978 | Shifflet, Jr. | 340/149 A |
| 4,142,235 | 2/1979 | Tadakuma et al. | 364/405 |
| 4,220,991 | 9/1980 | Hamano et al. | 364/405 |
| 4,337,393 | 6/1982 | Hilton | 235/487 |
| 4,471,434 | 9/1984 | Iwawaki | 364/405 |
| 4,595,985 | 6/1986 | Sakakiya | 364/404 |

FOREIGN PATENT DOCUMENTS

| | | | |
|---|---|---|---|
| 2731747 | 1/1979 | Fed. Rep. of Germany | 364/405 |
| 2522853 | 9/1983 | France | 364/405 |
| 0110171 | 9/1981 | Japan | 364/405 |
| 0178554 | 11/1982 | Japan | 364/405 |
| 0163668 | 9/1984 | Japan | 364/405 |
| 7900514 | 1/1979 | PCT Int'l Appl. | |
| 0121332 | 10/1984 | United Kingdom | |

OTHER PUBLICATIONS

Patent Abstracts of Japan, vol. 4, No. 74(P-13) (556), May 30, 1980, Japan 55 41504(A), dated Mar. 24, 1980.

*Primary Examiner*—Jerry Smith
*Assistant Examiner*—Kimthanh T. Bui
*Attorney, Agent, or Firm*—Wilbert Hawk, Jr.; Albert L. Sessler, Jr.; George J. Muckenthaler

[57] ABSTRACT

A method for encoding cash tills for the purpose of automating cash till reconciliation and operator sign-in. Encoding is done by use of a series of notches or apertures on the back of each till and reading the notches or apertures (go - no go) with switch-type sensors to identify the till and/or the operator. The applications include (1) more than one cash till per operator or (2) more than one operator per cash till, (3) identification of the cash till when placed in operation, or (4) identification of the cash till with each operation thereof. Reconciliation may occur at any desired interval of time such as daily, weekly or monthly—dependent upon the capacity of the cash till or the amount of activity.

*Assistant Examiner*—Kim Thanh Tbui

10 Claims, 4 Drawing Sheets

CASH DRAWER/OPERATOR IDENTIFICATION

BACKGROUND OF THE INVENTION

Over the years the mechanical cash register and the electromechanical cash register have been replaced gradually by the electronic cash register which provides faster and more efficient operation in retail establishments. The electronic cash register is normally operated by more than one operator within a given period of time, such as a day, and a record of transactions is usually maintained for each operator during his or her tour of duty at the register.

As in the case of the mechanical or the electromechanical cash register, the electronic register also uses a cash drawer arrangement which includes a removable cash till. The cash drawer is constructed to move outwardly from the cash register housing at the front thereof generally upon completion of each and every transaction. The removable cash till is positioned within the cash drawer and functions as a receptacle for coin, cash or checks received by the operator of the register. This arrangement can be viewed as a cash till in a cash drawer in a cash register which may be operated by one or more operators within a given period of time.

In recent years the supermarket has become a dominant part of the retail establishment and a plurality of cash registers or terminals are employed in the market. Dependent upon the operation of the business or the activity thereof, a number of operators may be assigned to each register, or one operator may be assigned to more than one register. In effect, the operation may be designed to employ more than one cash till per operator or more than one operator per cash till for a particular register.

In certain types of retail operations, if an error is made in the amount of the sale or if the operator makes an error in refunding change, it is difficult to identify the operator or the cash till involved in such a transaction. It is also seen that if a cashier transfers from one cash register to another, it is difficult to compare the amount in the cash till with an amount which should be credited to the operator. While there have been ways and means for identifying, checking, comparing and crediting amounts of money received and disbursed relative to a particular operator or a register, it is desired that a closer control of the operations be accomplished and maintained.

Representative prior art in the field of identification means for cash register or like operations includes U.S. Pat. No. 2,883,104, issued to D. J. Kintner on Apr. 21, 1959, which discloses a cash register drawer selecting apparatus in which a single cash register is normally used by two or more cashiers and includes two cash drawers spaced from each other and controlled by the single register. The two cash drawers are normally held closed by drawer latches, released by solenoids, and are arranged to be spring-urged open from opposite sides of the cabinet dependent upon the rotated position of the register.

U.S. Pat. No. 3,855,432, issued to J. E. Kelley et al. on Dec. 17, 1974, discloses a drawer position sensing, latch operated, switch assembly including a rotatable latch member and a slidably mounted, switch actuating member along with means for urging the drawer to an open position which urging means includes a solenoid for rotating both the latch member and the switch member.

U.S. Pat. No. 4,027,140, issued to H. Fowler et al. on May 31, 1977, discloses an electronic cash register having an inverted U-shaped housing with downwardly extending side members and a cash till positioned between the members and forming at least a portion of the bottom of the register.

U.S. Pat. No. 4,220,991, issued to K. Hamano et al. on Sept. 2, 1980, discloses an electronic cash register with removable memory packs for cashier identification, and including a first interface circuit with which a cashier memory pack is coupled, a second interface circuit with which a terminal memory pack is coupled, and a central processing unit operably connected to load the sales information for each transaction into the memory packs.

U.S. Pat. No. 4,337,393, issued to G. H. Hilton on June 29, 1982, discloses a cassette for banknotes which has a device on the side of the panel to identify the denomination of the banknotes. The device is encoded to enable an associated sensing means in the machine to interpret the encoded information. The encoding device may be either magnetic, mechanical or optical. The identification means may comprise one or more switch striking means disposed in a predetermined formation and adapted to actuate one or more associated electrical switches fixed to the dispenser when the cassette is moved to its operative position.

And, U.S. Pat. No. 4,471,434, issued to Y. Iwawaki on Sept. 11, 1984, discloses an electronic cash register selectively operable in a one clerk mode or a two clerk mode and including first and second keyboard means along with comparing means, set time memory means, detection means, and control means responsive to clerk mode signals for enabling one or the other keyboard means.

SUMMARY OF THE INVENTION

The present invention relates to electronic cash registers or terminals that include a cash till or drawer or other receptacle. More particularly, the invention relates to identification of cash drawers or tills associated with one or more operators, or to identification of operators associated with one or more cash tills. The invention deals with retail stores or like businesses that utilize an arrangement of more than one cash till per operator, or an arrangement of more than one operator per cash till.

The identification means provides for an identity of the cash till or drawer when it is placed into operation at the start of a tour of duty by an operator, or provides for an identity of the cash till or drawer with each operation of the register or terminal. A reconciliation of the contents of the cash till or the operations of the register may occur hourly, daily, weekly or even monthly, dependent upon the capacity of the cash drawer, the extent of the tour of duty of an operator, or the amount of activity for a specified period of time.

The structure of the present invention provides for encoding one or more cash tills with unique means for operator sign-in for performing the required transactions and for automatic cash till reconciliation at the end of the operator's tour of duty. The cash till or drawer includes a series of notches or openings in the rear wall and such notches or openings are operably associated with an equal number of sensing devices for providing identification of the cash till that is presently being used by an operator with a particular cash register.

The sensing devices or switches provide output signals by means of an unsolicited message to a central processor or terminal of the first approved use of the particular cash till in the particular cash register or terminal. When the identification of a particular cash till or drawer is made at a certain register, all of the information or data regarding the various transactions is then transmitted by way of the signals to the central terminal.

In a preferred arrangement of the present invention, the operator number (the number assigned to the specific operator) is keyed into the cash register or terminal. The operator number along with the number read by the sensing devices is sent to a central terminal. At the central terminal the combination of operator number and cash till number is compared against a list of valid combinations and the result of the comparison is returned to the sending terminal. The sending terminal then either prevents or allows the operator access to the particular terminal.

In the present drawer/operator identification scheme, the actual amount of money in the till is recorded by count, by journal tape, by CRT or like recording mechanism for the particular operator and cash till. When the cash till is removed by the operator and taken to a central office or like place to compare the actual amount of money with the recorded amount, such comparison can be performed by means of counting, CRT display or like means.

In view of the above discussion, the principal object of the present invention is to provide a method for identifying operators and/or cash drawers in a retail business.

Another object of the present invention is to provide means for identifying either an operator or a cash till associated with an electronic cash register.

An additional object of the present invention is to provide means for reconciling the amount of money in a particular cash till with the recorded amount.

A further object of the present invention is to provide an identification means for monitoring an operator associated with a cash till prior to permitting operation of a cash register.

Still another object of the present invention is to provide means for reconciling the contents of a particular cash till at the end of a period of time.

Additional objects and advantages of the present invention will become apparent and fully understood from a reading of the following specification taken together with the annexed drawing.

DESCRIPTION OF THE PREFERRED EMBODIMENT

Figure 1:
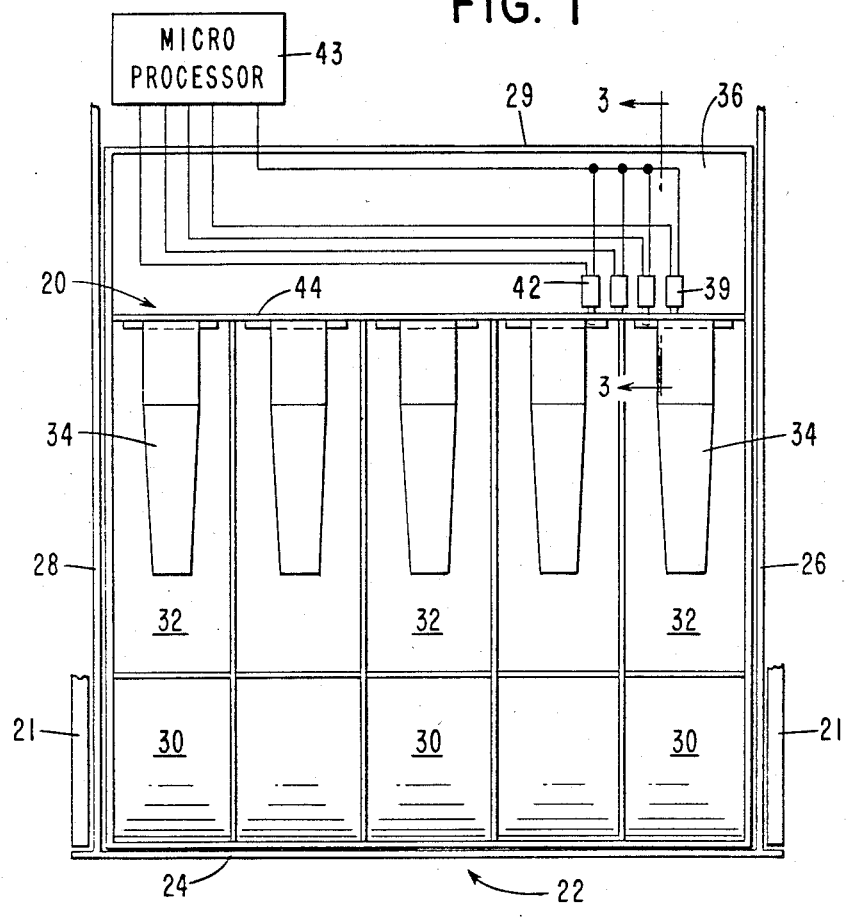
FIG. 1 is a plan view of a cash till, partly in diagrammatic form, incorporating the subject matter of the present invention.

Referring now to FIG. 1 of the drawing, there is shown a top or plan view of a cash till 20 for use in a cash register, only a portion 21 of the register being shown. The cash till 20 is formed to fit in a box-like receptacle or drawer 22 that is constructed to open and close or move in and out in slidable manner on suitable rails or like elements, not shown but which may be included in the portion 21 of the cash register. This particular construction is considered to be well-known art and need not be described in detail. The drawer 22 includes a front side or wall 24, a right hand side 26, a left hand side 28 and a rear wall 29 for enclosing and for containing the cash till 20.

The cash till 20 includes a plurality of coin pockets, as at 30, for containing the different denominations of coins and is formed to enable easy retrieval of the coins by the operator for making change in retail transactions. The cash till also includes a plurality of bill or check pockets, as at 32, for containing the different denominations of bills, along with associated bill holders 34 which swing upwardly and which may be spring loaded or urged to provide pressure against the bills in the pockets. Of course, it is also known that in certain cases the cash till 20 may be raised to provide space thereunder for other or unusual bills or checks on the floor 35 (FIG. 3) of the drawer 22.

The drawer portion 36, rearward of the cash till 20, is formed to hold or contain certain control mechanism, wiring and the like for the cash register. Such control mechanism may include drawer latching means, actuating means for releasing the drawer 22 upon completion of a transaction, or other mechanism. In the present embodiment the portion 36 also provides space for a plurality of switches 39, 40, 41, and 42 (FIG. 2) connected to a processor 43 located in the sending terminal. The switches 39, 40, 41 and 42 are "on-off" type and are connected to the processor 43 in the manner as shown in FIG. 1.

Figure 2:
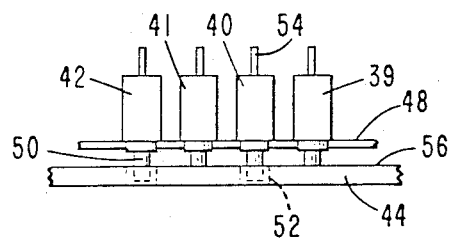
FIG. 2 is an enlarged view of certain structure illustrated in FIG. 1.
Figure 3:
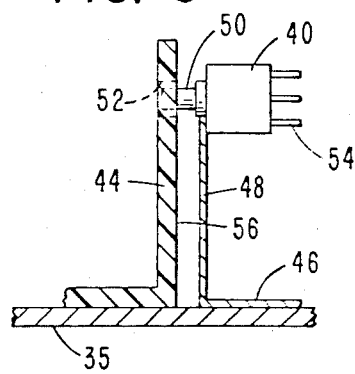
FIG. 3 is a view, partly in section, taken on the line 3—3 of FIG. 1.

FIGS. 2 and 3 illustrate the rear wall 44 of the cash till 20 which is associated with the switches 39, 40, 41, 42, the switches being supported by a support member floor portion 46 and an upstanding portion 48. The switches each include a spring-loaded plunger 50 which is continually urged in the outward direction or towards the left in FIG. 3. The rear wall 44 of the cash till 20 is provided with at least one aperture 52 and preferably two apertures therein, as shown in FIG. 2. The switches are supported by the support member portions 46 and 48 relative to the rear wall 44 of the cash till 20 in a manner wherein the apertures 52 allow the plungers 50 of two of the switches 40 and 42 to protrude through the apertures 52 in the wall 44. The switches 39, 40, 41, 42, of course, include terminals, as at 54, for connecting to the wires, as shown in FIG. 1. As seen in FIG. 2, there are two apertures 52 through which the plungers 50 protrude and there are two plungers 50 which contact the rear surface 56 of the wall 44 of the cash till 20. In the arrangement as shown, it is seen that the apertures 52 allow the plungers 50 of switches 40 and 42 to extend through the apertures in an "on" condition thereof, and that the plungers 50 of switches 39 and 41 are prevented from extension by the surface 56 of the wall 44 of the cash till 20 and, in effect, maintain the switches in an "off" condition. It is also within the scope of the invention to provide switch means, the operation of which may be opposite from the "on-off" arrangement just described.

While FIG. 2 shows one arrangement for encoding the cash till 20, it is understood that other codes are available with all the different combinations of apertures (or no apertures) associated with the plungers 50. Slots or other recesses in the rear wall 44 of the cash till 20 may be used in place of the apertures 52. In this manner, a cash till 20 can be associated with one or more operators, or one or more cash tills can be associated with one operator. The cash tills can be tagged with identifying numbers and each operator can be given an identification number for the purpose of keeping and maintaining a record of the cash drawer and the operator.

Figure 4:
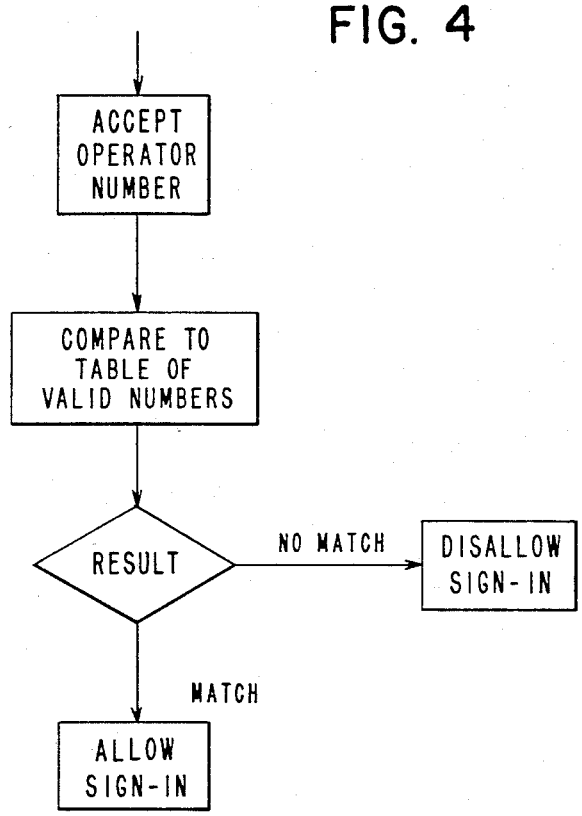
FIG. 4 is a flow chart showing operator sign-in at a register without use of a codable cash till.

FIG. 4 shows a simple flow chart of identification wherein the number of the operator (or other operator identification) is accepted by the sensor or other receiving means and such number is compared to a table of valid operator numbers. If the operator's number does not match with any one valid number, the operator will not be allowed to sign-in as an operator of a particular or specified cash register, whereas if there is a match of a valid number with the operator's number, the operator can sign-in for operation. In this diagram there is only a comparison of an operator's number with a table of valid numbers for identification purposes in allowing or disallowing sign-in of the operator.

Figure 5:
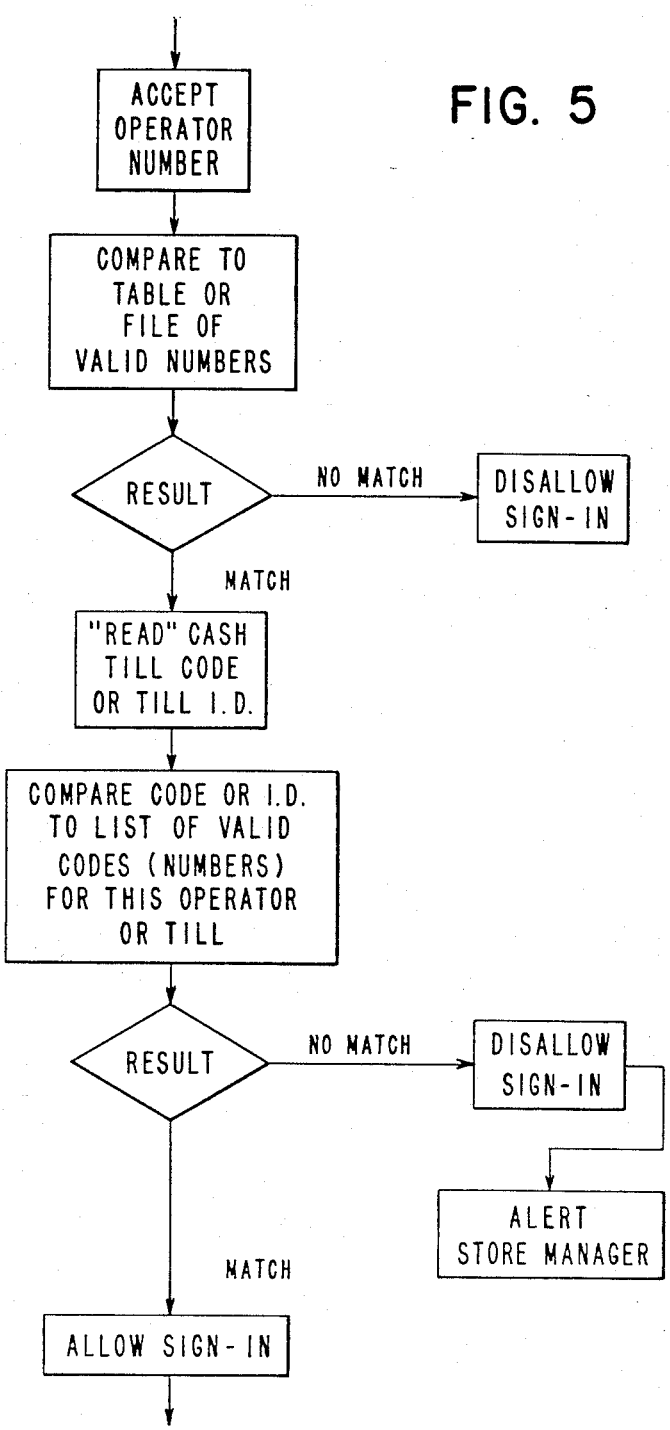
FIG. 5 is a flow chart showing operator sign-in at a register using a codable cash till.

FIG. 5 illustrates a flow chart of an arrangement involving a codable cash till wherein the number of the operator is accepted by the sensing or receiving means and is compared to a table or file of valid operator numbers. Again, if the operator's number does not match with any one valid number, the operator will not be allowed further access to a particular register. If there is a match of the operator number with one of the valid numbers, the cash till number or code or other identifying means is read and compared with a list of valid codes for this operator. The cash till number or code may also be read and compared with a list of valid codes for the cash till, if such arrangement is satisfactory. If there is a match of the code or other identifying means of the operator with one of a list of valid codes for the operator or the cash till, the operator can continue and sign in for duty. If there is no match at this stage of the identifying process the operator will not be allowed to sign-in and the store manager will be alerted to such condition.

Figure 6:
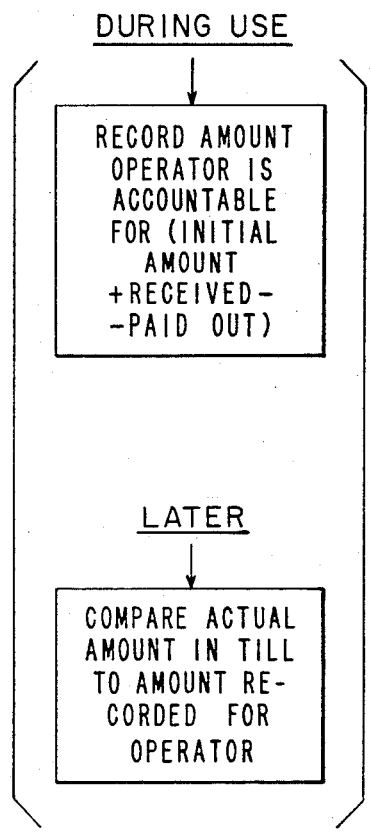
FIG. 6 is a flow chart showing reconciliation without use of a codable cash till.

FIG. 6 shows a simple arrangement for reconciliation of the amount in a particular cash till for a specified operator at the end of a tour, of duty. It is seen that during a tour of duty involving use of a particular cash till, the correct amount to be accountable is the initial amount in the cash till plus the amount received minus any amount paid out. Later on or after the tour of duty, the actual amount of money in the cash till is compared to that amount for which the operator is responsible or that amount which is recorded for such operator.

Figure 7:
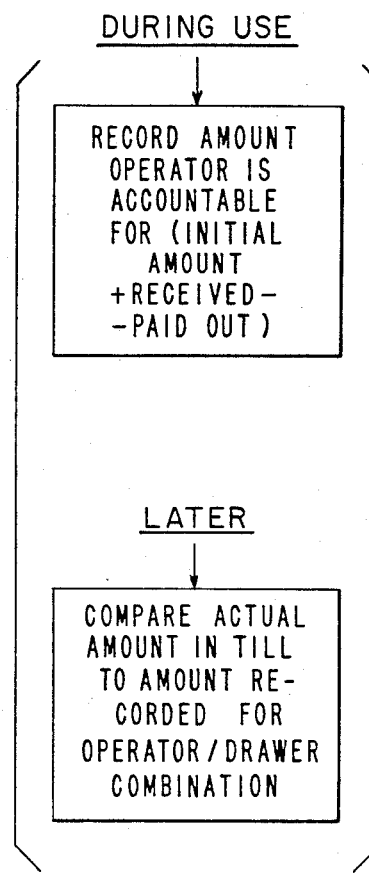
FIG. 7 is a flow chart showing reconciliation using a codable cash till.

FIG. 7 illustrates an arrangement wherein the recorded amount for which the operator is accountable during a tour of duty involving use of a particular cash till is seen to be generally the same as in FIG. 6. Later, the actual amount of money in the cash till is compared to that amount for which the combination of the identified operator and cash till is responsible in the manner wherein the encoded arrangement is effective in the accounting of the receipts. The operator/drawer combination involves and effects the use of a codable cash till in a reconciliation of the amount of money for a particular operator.

Figure 8:
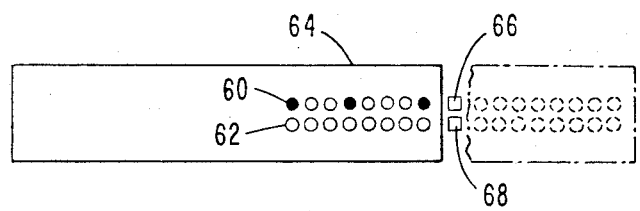
FIG. 8 is a modification of the cash drawer identifying means of the present invention.

While the switch-and-aperture arrangement is preferred in the present invention, FIG. 8 shows a modification wherein an upper line of marks 60 or the like and a lower line of marks 62 are provided in the side of the cash till 64. The upper line of marks represent an encoding arrangement wherein one or more of the marks may be darkened for sensing by a code sensor 66. The lower line of marks represent timing marks to be read by a timing sensor 68. The lines of marks 60 and 62 may be placed on the right side wall 26 of the drawer 22 and the sensing means may be supported from the portion 21 of the cash register.

The coding or encoding concept of the present invention may include alternative arrangements such as snap in or glued fillers in certain recesses in the rear wall 44 of the cash till 20, or the till may be identified with use of magnets operable with mechanical or Hall-effect sensing switches.

It is thus seen that herein shown and described are a method and apparatus of operator/drawer identification wherein a codable cash till is utilized in the operation. The method and apparatus of the present invention enable the accomplishment of the objects and advantages mentioned above, and while a preferred embodiment and a modification have been disclosed herein, other variations may occur to those skilled in the art. It is contemplated that all such variations not departing from the spirit and scope of the invention hereof are to be construed in accordance with the following claims.

I claim:

1. A method for monitoring the signing in of an operator at a terminal prior to permitting operation thereof, said terminal having at least one receptacle, the method comprising the steps of entering a number identifying the operator into the terminal, comparing the operator-identifying number with a file of valid operator numbers, operably moving the receptacle into a position for sensing a code identifying the receptacle, comparing the receptacle identifying code with a list of valid receptacle-identifying codes associated with said operator, and allowing the operator to sign in upon comparison and matching of the operator-identifying number with a valid operator number and upon comparison and matching of the receptacle-identifying code with a valid receptacle code.

2. The method of claim 1 including the additional step of disallowing signing in of said operator when the operator entered operator identifying number does not match a valid operator number.

3. The method of claim 1 wherein the receptacle includes a plurality of apertures in one wall thereof and the terminal includes spring-loaded plunger means for sensing the apertures for identifying the receptacle.

4. The method of claim 3 wherein the sensing means comprises a plurality of switches greater in number than the number of apertures and having plungers operable to protrude into said apertures to sense an identifying code for said receptacle.

5. A method for reconciling the contents of a retail terminal cash till with a recorded amount which is associated with a particular operator at the end of the tour of duty by the operator of the retail terminal, the method comprising the steps of identifying the operator and the cash till by comparing an identifying number of the operator with a valid operator number which is indicative of and identifies the particular operator associated with the cash till and by reading a cash till code by moving the cash till into position to actuate switch means operable by movement of the cash till for identifying said cash till and by comparing the identified cash till with a valid cash till code, recording the amount for which the operator is accountable at the end of said tour of duty, said amount consisting of the addition of an initial amount at the start of said tour and an amount received during said tour, and the subtraction of an amount paid out during said tour, and comparing the actual amount in the cash till at the end of said tour of duty with the recorded amount which is associated with said particular operator during said tour of duty.

6. The method of claim 5 wherein the cash till includes a plurality of aligned apertures in one wall thereof and the retail terminal includes spring-loaded plunger means operable for sensing the apertures for identifying the cash till.

7. The method of claim 6 wherein the sensing means comprises a plurality of switches each having a plunger operable with at least one of said apertures to provide a code for identifying said cash till.

8. In a retail terminal having a cash till as a component thereof and operable by an operator to move the till from an open position to a closed position, the improvement comprising means for identifying the cash till as assigned to the operator for the purpose of reconciling the contents of the cash till on a periodic basis, said identifying means comprising a plurality of adjacent apertures positioned on the exterior side of the till and aligned in a direction trasnverse of movement of the cash till from the open to the closed position, certain of the apertures being closed and certain of the apertures being open to reflect a predetermined coded pattern, and a plurality of switch elements having spring-loaded plungers for sensing the closed apertures and the open apertures for identifying the cash till when the same is moved from the open position to the closed position.

9. In the retail terminal of claim 8 whrein the apetures are slots sensed by said switch elements for providing a code of said cash till.

10. In the retail terminal of claim 8 wherein said switch elements include plungers operable with said apertures for providing a code of said cash till.

* * * * *